July 3, 1945.  P. PRITCHARD  2,379,651

ELECTRIC RESISTOR FURNACE FOR THE HEATING AND MELTING OF METALS

Filed Feb. 8, 1944  2 Sheets-Sheet 1

INVENTOR
PERCY PRITCHARD
BY
Scrivener & Parker
ATTORNEY

July 3, 1945.   P. PRITCHARD   2,379,651
ELECTRIC RESISTOR FURNACE FOR THE HEATING AND MELTING OF METALS
Filed Feb. 8, 1944   2 Sheets-Sheet 2

INVENTOR
PERCY PRITCHARD
BY
Seuvener & Parker
ATTORNEY

Patented July 3, 1945

2,379,651

UNITED STATES PATENT OFFICE 2,379,651

ELECTRIC RESISTOR FURNACE FOR THE HEATING AND MELTING OF METALS

Percy Pritchard, Wootton Wawen, England

Application February 8, 1944, Serial No. 521,554
In Great Britain December 2, 1942

5 Claims. (Cl. 13—23)

The invention relates to the heating and melting of light metals in an electric furnace. By "light metals" is meant aluminium and alloys of aluminium, and magnesium and alloys in which magnesium is the base, and any other light alloys of similar or lower melting points.

It is known, especially in laboratory furnaces, to employ crucibles for containing metals to be heated and melted in electric resistor furnaces, but the resistor substance is usually granular carbon.

In my improvements relating to the heating and melting of light metals in electric furnaces a fused salt is employed in the furnace chamber to which alternating current is supplied and the light metal is charged into an airtight pot submerged, approximately, to the level of the metal in the pot in the fused salt which thus surrounds the pot on all sides and any metal which escapes in the event of a fracture of the pot passes into the fused salt and firing is prevented.

The invention also therefore includes an electric furnace for the heating and melting of metals in this way, such a furnace comprising a fused salt as the resistor in a furnace chamber provided with suitable electrodes and a closed vessel or pot into which the metal is charged is mainly submerged in the fused salt in the furnace chamber.

It is a feature of the furnace that the closed vessel should be provided with a delivery passage and tapping means such as a spout and means for placing the metal under suitable pressure to cause it to pass through the delivery passage.

Other features of the invention will be pointed out in the claims hereinafter appearing.

In the appended drawings I have given one example of construction of a furnace:

Figure 1:
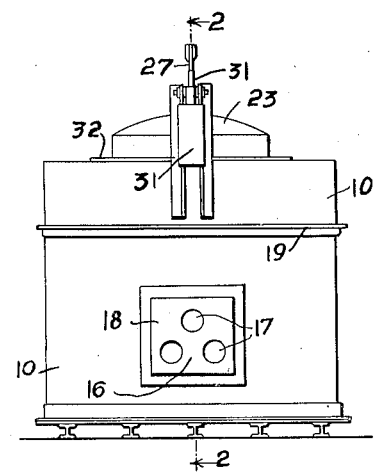
Figure 1 is an elevation of the furnace looking from the left at Figure 2.

The furnace is here shown as cylindrical and consists of a casing 10, with heat insulation 11, and a sand packing 12 within this surrounding the firebrick wall 13 of the furnace chamber 14. Within the chamber 14 is a fused salt or mixture of salts up to the level 15. The sand packing 12 serves to arrest any leakage of salt through the firebrick wall 13 of the furnace chamber. Through the wall of the furnace are inserted three electrodes 16 for carrying the alternating current to the salt within the furnace chamber 14. Each of the three electrodes consists of three carbons inserted in the bores 17 in the insulating blocks 18, the carbon rods being wired in parallel for carrying three phase current. The furnace in this example is intended to be sunk in a pit up to say, the flange 19, so that the height of the working gear on the upper part of the furnace is at a convenient level for manipulation. Within the furnace chamber 14 is arranged a pot or crucible 20 for containing the metal to be heated. This pot is shown as a steel vessel with domed ends 21 each welded in place to make a completely closed shell. Within the upper end a charging opening 22 is cut and is provided with a short neck passing through heat insulation 23 on this upper end around which neck a sealing channel 24 is formed to receive a flanged closure or door 25. The door as here illustrated is hinged at 26 on an axle to which an operating arm 27 is secured and linkage connects this arm to an axle 28 carried in upstanding brackets on the furnace side, on which axle is keyed an operating lever 29 provided with a handle 30 and with a suitable counterbalance 31. Around the upper end of the metal pot 20 is an attachment rim 32 which bridges over the furnace chamber and is suitably secured in the furnace chamber wall 13 as, for example, by dowel pins 33 passing up through apertures in the rim and cotter pins 34 through these dowels; by this means the pot is retained in a submerged condition within the salt in the furnace chamber.

Figure 3:
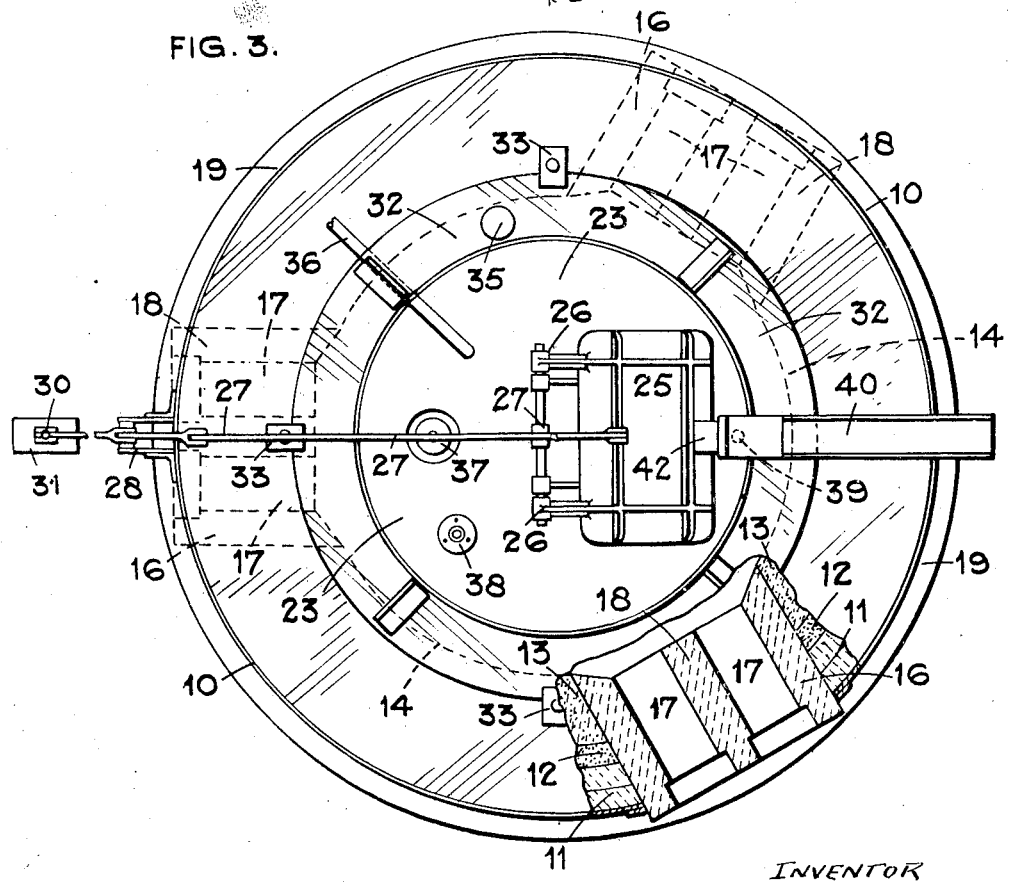
Figure 3 is a plan with one part in section on the line 3—3 of Figure 2.

Through the rim 32 is formed a hole 35, see Figure 3 which serves for replenishing the salt in the furnace chamber to make up for evaporation and other losses. When it is desired to remove the salt from the furnace chamber a tube can be inserted through this hole 35 with an air pipe and the salt removed by the well known air-lift pump method.

If desired this hole can also be used for the insertion of a pyrometer for checking the salt temperature. An air inlet nozzle 36 is carried to the upper part of the interior of the metal pot 20 so that the metal can be placed under a suitable pressure and a safety valve such as the loaded mushroom valve 37 is provided in the top of the pot by means of which the pressure in the closed pot can be safely regulated. A hole for a pyrometer for measuring the temperature of the metal in the interior of the pot may be carried through the top. This is preferably done by welding a short length of tube into the top and providing it with a support flange as shown at 38, Figure 3.

Figure 4:
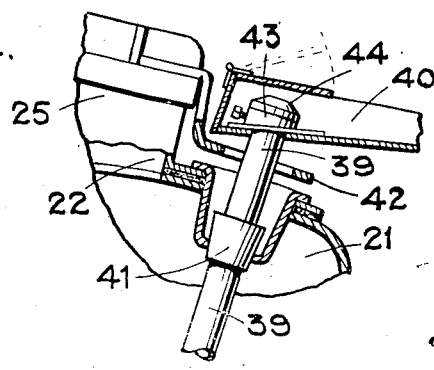
Figure 4 is a detail view of a metal delivery pipe where it passes out of the pot.

For the purpose of discharging the molten metal from the pot 20 a delivery pipe 39 open below the surface of the metal in the pot is carried up through the top adjacent to the charging opening 22 where it passes out through the bottom of a troughed tapping spout 40. The upper end of this pipe 39 is provided with a conical attachment collar or bung 41 where it passes through the top of the pot, which bung makes an airtight seating in the aperture at the bottom of a recessed seating in the top, see Figure 4. This enables the pipe to be readily placed in position and removed to permit an alternative pipe to be readily fitted when a pipe which has been in use for some time requires to be cleaned and re-conditioned. Above the bung 41 the pipe passes through a hasp plate 42 secured to the front of the door 25 and above this again it passes into the troughed spout 40. It then receives a collar 43 secured to it by a pinch bolt, and finally a screwed perforated cap 44. The adjacent end of the spout has a closing wall and above the pipe a closing flap is hinged to the wall to prevent any spluttering over of metal as it leaves the cap 44.

Any suitable means in place of the hasp plate 42 may be employed to prevent the charging door from being opened while the pipe 39 is below the opening; thus the pipe 39 cannot be damaged by solid metal or ingots charged into the pot 20. The pipe and the spout can easily be lifted away to free the door.

Figure 2:
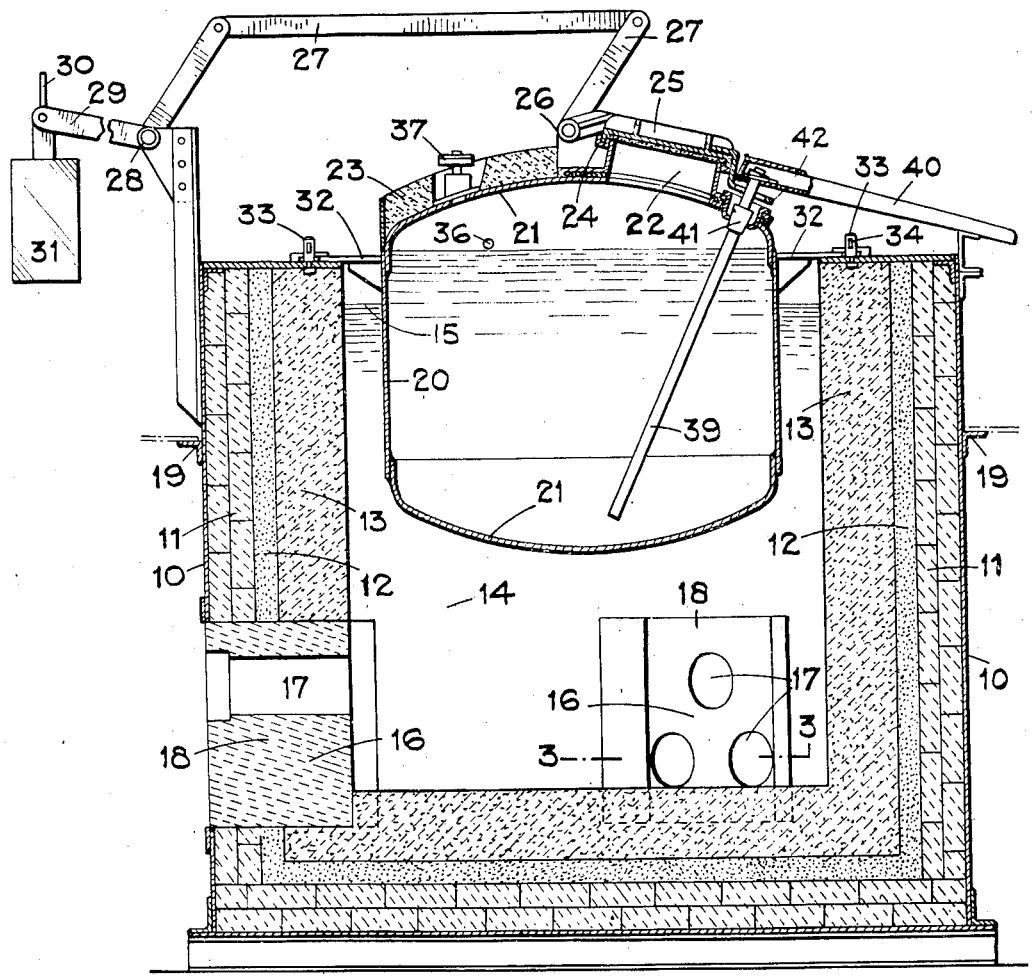
Figure 2 is a vertical section thereof on line 2—2.

In operating the furnace, the salt in the furnace chamber 14 is first fused and brought to a suitable temperature. This may be done as is known in electric furnace practice by the use of a separate auxiliary circuit. When the salt in the neighbourhood of the three electrodes 16 is molten the main current may be switched on to these electrodes and the auxiliary circuit cut out. Metal is charged into the pot 20, or has been previously charged therein, by manipulating the charging door 25 through the gear shown clearly in Figure 2 of which the control point is remote from the heat and from the working space of the top of the furnace. After the metal is melted and is at the desired temperature for removal it may be tapped off by applying air under low pressure through the air inlet nozzle 36 into the space under the top of the pot. By this means the metal is caused to rise up the pipe 39 the pressure being so adjusted that the metal will gently over-flow at the upper open end of the pipe where it emerges into the trough of the tapping spout 40 by which it is run into crucibles or other vessels and carried away for any other operation such as refining or casting.

The tapping spout can be arranged at a small angle to the horizontal (for example between 5° and 12°) so that the metal which is gently discharged on to it will flow slowly along it and any oxide skin forming on the metal as it comes in contact with air is arrested by the surface of the spout with the result that the clean metal flows through the centre of the stream and is protected by the skin from further oxidation.

The furnace illustrated is intended for the heating of a substantial charge, for example, sufficient to provide an output of a ton of molten metal per hour. Such a charge of a light metal such as magnesium may be safely undertaken in the completely closed pot 20 surrounded as it is by the liquid salt which is also enclosed in the furnace chamber by the bridging attachment rim 32 of the pot. By this means all danger attendant upon leaks or damage to the pot is removed as the metal escaping in this way is discharged into the salt. By employing for the resistor electrolyte a suitable salt or mixture of salts such, for example, as a mixture of potassium or sodium chlorides no vigorous re-action would occur between the salt and the metal or alloys. I can also control the density of the electrolyte so that any combustible molten metal or alloy will only just float therein and will be constantly washed over by the liquid salts, or even so that it sinks therein.

I claim:

1. Electric furnace for the heating and melting of light metal, comprising a furnace chamber adapted to be charged with a fused salt which acts as a resistor to the passage of an alternating current, means in the wall of the furnace chamber for mounting electrodes therein to supply alternating current to the salt, a closed vessel within the chamber and adapted to be principally but not entirely submerged in the salt therein, a closure for the top of the chamber around said vessel having therein means for feeding salt thereto, said vessel having a charging opening therein for the introduction of light metal, a closure for said opening, a movable pipe within the vessel extending from the lower part to the outside, a tapping means for the molten metal to which tapping means the pipe delivers metal when pressure is applied to the interior of the vessel, the closure for the charging opening, the delivery pipe, and the tapping means being so arranged that the closure cannot be opened until the delivery pipe is moved out of the path of the metal charged into the vessel through the opening.

2. Electric furnace for the heating and melting of metals having a fused salt resistor electrolyte with a closed pot or crucible for the metal to be heated mainly submerged therein in which a delivery pipe from the pot projects through a conical recess in the top of the pot and has a conical collar around its upper end to form a bung seating in the recess so that the pipe can be retained by merely pushing it into place with its seating bung in the said recess, and one pipe can readily be interchanged with another.

3. Electric resistor furnace as claimed in claim 2 and having a charging door in the top of the pot adjacent to the point where a removable delivery pipe projects through a conical recess in the top of the pot, wherein a hasp plate is secured to the charging door and has an opening through which the delivery pipe passes to its connection in the trough of a tapping spout, said spout being arranged at a small inclination to the horizontal in a position where it extends from the said charging door over the side of the furnace whereby the charging door cannot be opened until the delivery pipe and tapping spout have been removed.

4. Electric resistor furnace for melting light metals comprising in combination a suitable heat-insulated casing with a furnace chamber therein, a flange around said casing for receiving a flooring, the furnace below said flange being built into a pit; electrodes for the supply of alternating electric current to a salt filling the furnace chamber whereby the salt is maintained in fused condition during working of the furnace, a closed metal pot mainly for receiving the metal to be melted which is submerged in the fused salt in the furnace chamber, said pot carrying an attachment rim near the top which bridges over and closes the top of the furnace chamber so as to enclose the fused salt; a charging door for the closed pot connected by operating means with a hand-lever at the side of said casing remote from the door opening and compressed air supply means for delivering molten metal from the closed pot to a tapping spout, whereby any metal that may escape through a fracture or weakness in the wall of the metal containing pot passes into the fused salt enclosure and firing is prevented.

5. Electric resistor furnace for the heating and melting of light metals, comprising a furnace chamber in which a fused salt is employed, means in the wall of said furnace chamber whereby electrodes for the supply of alternating current to the fused salt can be horizontally disposed in the lower part of said furnace chamber, a closed vessel for containing the light metal to be heated arranged in said furnace chamber above said electrodes in such a position that it is sumberged in the fused salt except for its upper closed end wherein an opening for the introduction of light metal is arranged, a movable closure for said opening, a delivery pipe carried from a spout on said upper end of the closed vessel to a part in the interior well below the level of the molten metal therein during the operation of the furnace whereby when pressure is applied to it the metal is discharged from said closed vessel through said delivery pipe, means for applying fluid pressure to said closed vessel, and closure means for the upper end of the furnace chamber around the top of the closed vessel.

PERCY PRITCHARD.